Jan. 12, 1932.  J. T. HELBERT  1,840,581

TRAP

Filed Jan. 12, 1931  2 Sheets-Sheet 1

INVENTOR
J. T. Helbert
BY
Siggers & Adams
ATTORNEYS

Jan. 12, 1932.    J. T. HELBERT    1,840,581
TRAP
Filed Jan. 12, 1931    2 Sheets-Sheet 2
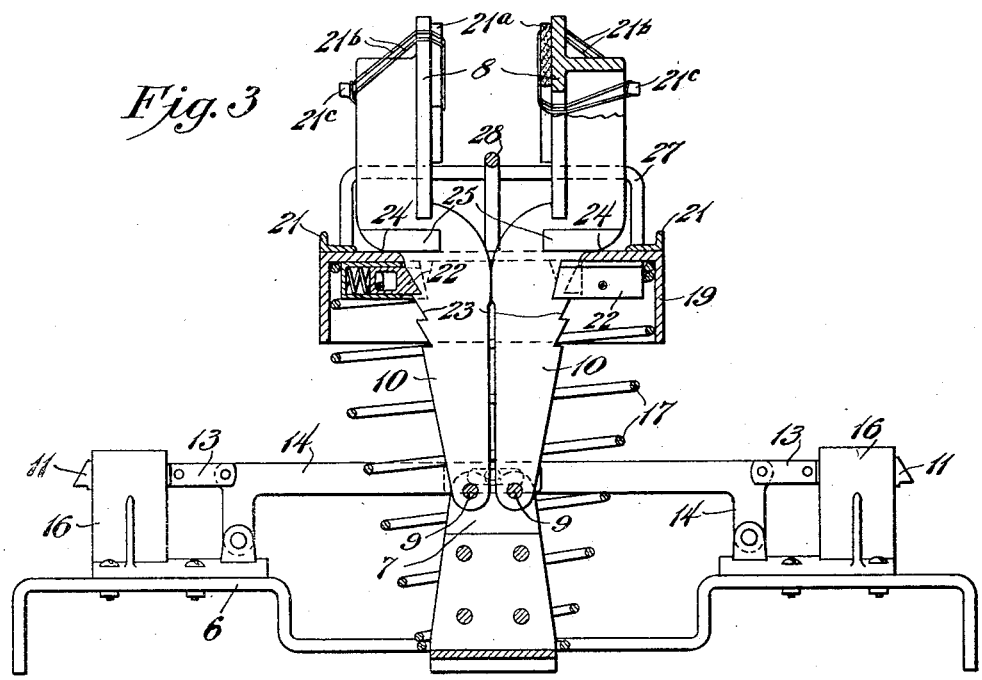
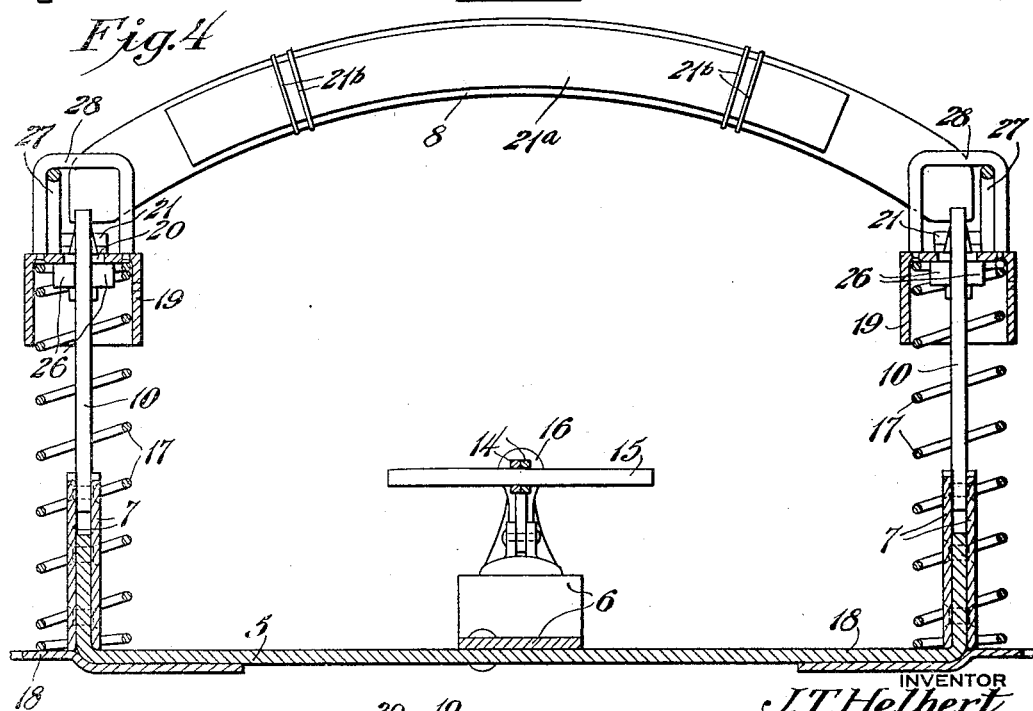
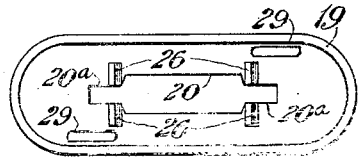
INVENTOR
J. T. Helbert Patented Jan. 12, 1932

1,840,581

UNITED STATES PATENT OFFICE

JOHN T. HELBERT, OF BROADWAY, VIRGINIA

TRAP

Application filed January 12, 1931. Serial No. 508,311.

This invention relates to jaw traps and, among other objects, aims to provide a jaw trap which may be used to capture chicken thieves, being so constructed that the more the victim struggles the closer together the jaws move. A further object is to provide a jaw trap having jaw locking mechanism which prevents the jaws from being pried apart by the victim, the mechanism itself being so guarded that the victim cannot release himself. A further object is to provide a jaw trap for the purpose stated which is so constructed that the victim is not injured in any way.

Other objects will appear from the following description showing a preferred embodiment of the invention.

In the accompanying drawings forming part of this specification,

Fig. 3 is a view like Fig. 2 but showing the trap sprung, one of the jaws being shown in section;

Fig. 4 is a side elevation, with the parts in section, of the trap in the position of Fig. 3; and Fig. 5 is a bottom plan view of the housing for the jaw latches.

Figure 1:
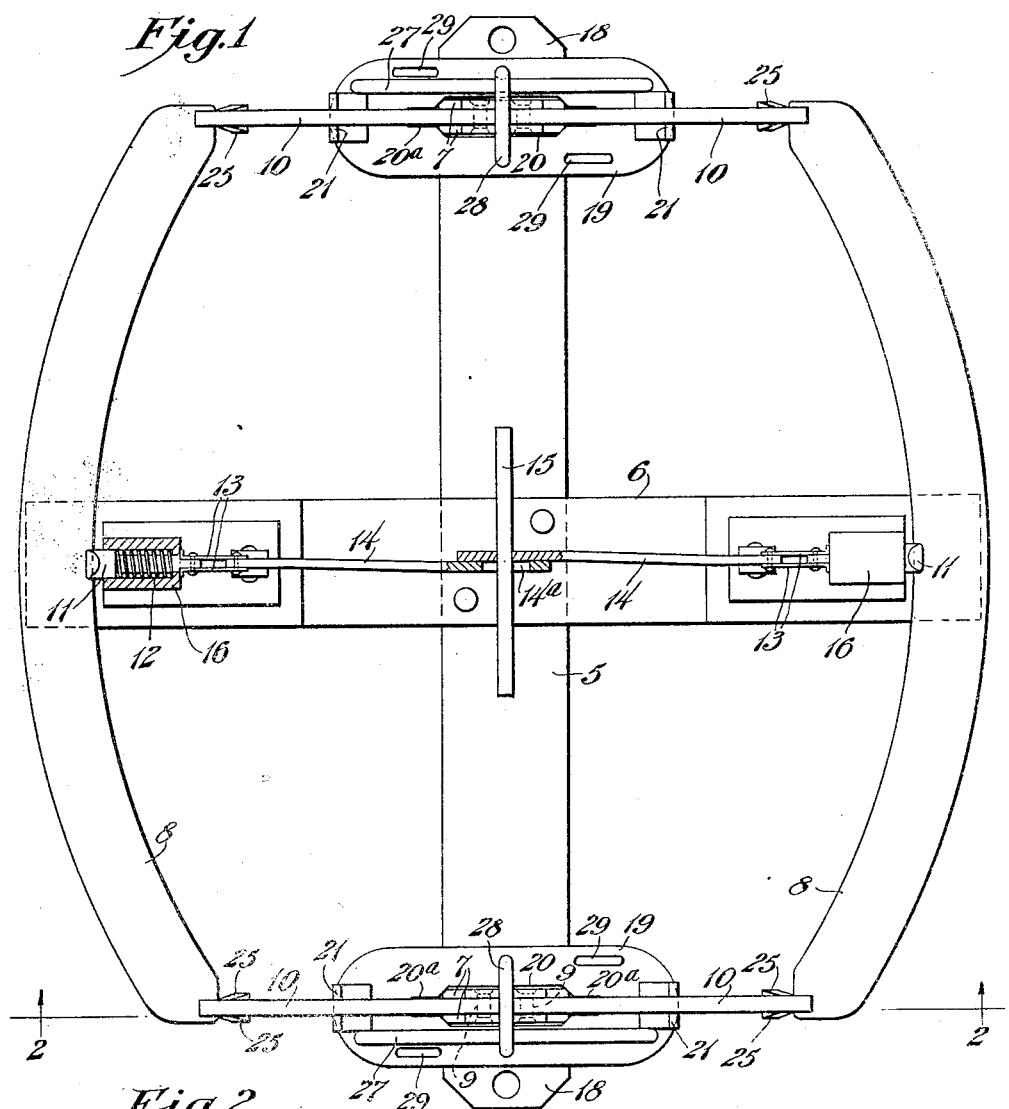
Fig. 1 is a plan of the trap shown set, the jaw tripping mechanism being shown in horizontal section.

Referring particularly to the drawings, the trap comprises a frame in the form of a cross consisting of members 5 and 6 extending at right angles to each other and secured together at their central portions. The member 5 has upturned ends, as shown in Fig. 4, to which plates 7 are secured on either side thereof to provide spaced members for the pivoting of the jaws 8, as indicated at 9. The jaws 8 are more or less U-shaped, as shown, and each comprises a pair of shanks 10 and an intermediate gripping portion which, as shown in Fig. 3, is generally T-shaped in section, presenting a wide substantially flat surface for engagement with the limb of the victim. The jaw shanks 10 are narrowest at their pivoted ends and widen outwardly and are offset relative to the gripping portions, as shown in Fig. 3, the jaw shanks engaging each other when the jaws are in sprung position, so as to hold the gripping portions spaced a certain distance apart. Preferably the distance between the opposed faces of the jaws, when in sprung position, is less than the least thickness of the human ankle so that both jaws will engage the limb of the person caught, and because of the locking mechanism to be described, will prevent the escape of such person.

In order to hold the jaws in set position, jaw latches are provided together with a trip, as best shown in Figs. 1 and 3. The two latches 11 are normally held in extended position by means of the latch springs 12 and are connected by links 13 and a lever 14 with a trip bar 15. Preferably one of the levers 14 has a slot 14ᵃ through which the trip bar 15 extends, so that relative movement between the ends of levers 14 may take place when the trip bar is depressed. The levers 14 are pivotally mounted on the ends of frame member 6 and the latches 11 are mounted adjacent thereto in a casing 16. The described construction provides very simple mechanism for holding both jaws open and for permitting simultaneous release of the two jaws if the victim treads in the area between said jaws. The trip bar 15 may have various forms and may be spread over a considerable area so as to insure tripping of the trap.

Figure 2:
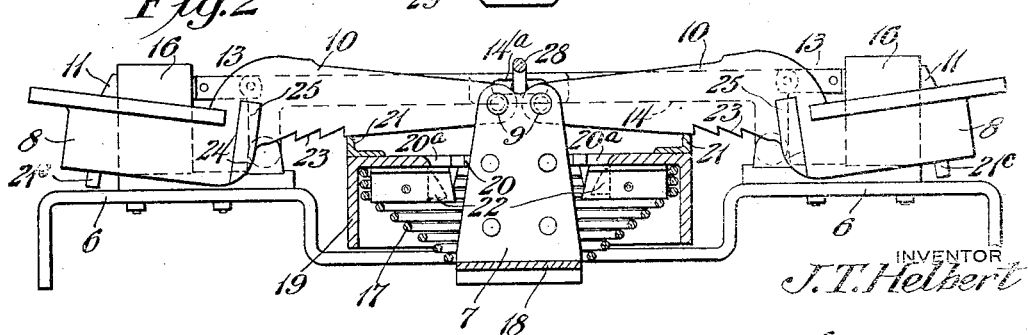
Fig. 2 is a section on the line 2—2 of Fig. 1.

To force the jaws together when the trip is stepped on, convolute springs 17 are provided, being interposed between the ends of the frame member 5 and the jaws. To provide an adequate foot or abutment for the lower ends of the springs 17, an extension piece 18 may be welded on the underside of the frame member 5 at the opposite ends thereof. The spring 17 does not bear directly against the jaws but bears against the underside of a housing 19 and is substantially enclosed by said housing when the trap is in set position, as shown in Fig. 2. The housing is closed on all sides, except the bottom, as shown, but has a narrow slot 20 at its top, said slot being barely wide enough for free movement of the housing on the plates 7. As shown in Fig. 1, the slot 20 has narrow end portions 20ᵃ which are barely wide enough to permit movement of the housing over the shanks 10 when the jaws are nearly closed.

Referring to Figs. 1 and 2, it will be seen that the housing 19 has two small angle pieces 21 at its opposite ends, each of said angle pieces bearing against the corresponding jaw shank 10 when the trap is in set position. In this position the entire force of the two tightly coiled springs will be transmitted through the housing and through the angle pieces 21 to the jaw shanks. The angle pieces 21 are at the extremities of the housing 19 so that each spring has a considerable leverage, the lever arms being measured by the distance between the center of each angle piece 21 and the center of the corresponding pivot 9. However, when the jaws are partly closed, the angle pieces 21 no longer are in contact with the jaw shanks and, as will be understood by comparing Figs. 2 and 3, there is a moment during the upward movement of the jaws when the contact between the housing and the jaws shifts to the ends of the narrow slots 20ᵃ. As the ends of said slots 20ᵃ are much closer in to the centers of pivots 9 than are the angle pieces 21, it follows that the effective force of the springs 17 is much diminished when the point of contact between the housing and the jaw shanks shifts from angle pieces 21 to the ends of slots 20ᵃ. The purpose of this shifting in the points of contact is to lessen the force with which the jaws close, thus preventing injury to the victim of the trap. The chances of injury are further minimized by the broad flat jaw faces, previously described, and by the use of strips of soft, resilient material 21ᵃ (Figs. 3 and 4) which may be secured upon said jaw faces by elastics 21ᵇ passed around the jaws and around lugs 21ᶜ integral with said jaws.

While the trap is designed to be a humane one, it is so made that the victim cannot release himself. This result is attained by the employment of four jaw locks 22, two of the locks being in each housing 19, as best shown in Figs. 2 and 3. Each of the jaw locks 22 consists of a spring-pressed latch lying in the plane of and extending toward a jaw shank 10. Each of the jaw shanks, as shown in Figs. 2 and 3, is provided with a series of notches 23 along the outer edge thereof. Because of the increasing width of the jaw shanks in a direction receding from the pivots 9, the notches 23 are at increasing distances from the medial plane of the trap, that is, the vertical plane intermediate the jaw pivots. As the jaws move upwardly to closed position, the locks 22 engage successively with the notches 23 rising with the housing 19. The extent of rise of the housing 19 at each side of the trap depends upon the relative position of the jaws 8 and if, when the victim is first caught, the jaws are not in their closest-together position, the locks 22 will engage in one of the lower notches 23 and the slots 20, 20ᵃ of the housing will permit a certain lateral movement of each housing relative to the jaw shanks. As the victim struggles to release himself, the reaction from such struggles is transmitted to the housing and it will move upwardly one notch at a time, the spring 17 actually causing each housing to climb first on one side and then on the other, or in a step-by-step manner. The final position of each housing 19 is the one illustrated in Fig. 3, in which the locks 22 engage in the upper most notches 23. In this position, the jaws are closest together and cannot move apart because of the engagement with the tops of the two housings 19 which fit tightly against the undersides of the shoulders 24 of the jaws. Neither housing can move downwardly at any time after the trap is sprung because of the engagement of the locks 22 with the shoulders provided by the notches 23.

It will be noted that it is impossible for the victim to free himself once he is caught. Each jaw has wings 25 projecting laterally from each side of each shank 10 (Fig. 1) and covering the slot 20ᵃ, as shown in Fig. 3, when the jaws are closed. Thus an implement such as a pen knife cannot be thrust down into the housing between the jaw shanks and the locks 22 to release said locks. It is impossible to free the jaws by working at the locks from the bottoms of the housings, because there are four locks which must be substantially simultaneously disengaged to permit opening of the jaws. Even one lock cannot be forced back with any ordinary implement because each lock is made very inaccessible and is protected further by a pair of lugs 26 (Figs. 4 and 5) fixed to the top of housing 19 and projecting downwardly therefrom and located on either side of the slot 20ᵃ where it joins the wider slot 20.

The described trap is designed to be placed outside an entrance to a chicken yard or near a hen roost and will be covered with loose dirt, straw and the like. To prevent the dirt and straw from interfering with the closing movement of the jaws, a guard is provided, said guard being preferably in the form of two bars 27, 28, secured, as by welding, to the top of the housing. The bar 27 extends longitudinally of the housing adjacent but outside of the jaw shanks 10, while the bar 28 is at right angles to the bar 27 and preferably extends over the bar 27, as shown in Fig. 4, the bar 28 lying in the medial vertical plane of the trap or directly above and between the pivots 9. The guard, in conjunction with the substantially closed top of the housing 19 on which it is mounted, prevents such clogging of the jaw pivots and housing as would interfere with the free action of the trap.

After the victim has been captured, the trap may be released from his leg by special keys (not shown), each having an arm at right angles, introduced through narrow slots 29 (Figs. 1 and 5) in the top of the housing, and engaged with the spring-pressed plungers or bolts of locks 22 in any desired manner so as to draw back the bolts from engagement with notches 23. Instead of this arrangement, the bolts may be withdrawn by means of keys of the multi-tumbler type (not shown).

While the described trap is particularly designed for catching human beings and is especially made to be humane, many features of the invention would be useful in animal traps and I do not wish to be limited by the preferred use to which the trap will be put.

Obviously the present invention is not restricted to the particular embodiment thereof herein shown and described.

What I claim is:—

1. In a trap in combination an X frame; a pair of jaws pivoted at the opposite ends of one member of the X frame; a pair of jaw latches on the opposite ends of the other member of the X frame; trip means connecting the two latches together so that they are tripped simultaneously; housings each movable longitudinally of the two adjacent jaw shanks and surrounding the same when the jaws are closed and surrounding the ends of that member of the X frame to which the jaws are pivoted when the jaws are open; a pair of spring-pressed latches in each housing; a series of notches on the outer edge of each jaw shank for engagement with the latches to hold the jaws closed; and springs interposed between the housing and the frame to urge said jaws toward closed position.

2. In a trap in combination a frame; a pair of jaws pivoted upon the frame; trip means on the frame for holding the jaws open; springs on the jaw shanks interposed between the jaws and the frame and tending to close said jaws; housings surrounding the jaw shanks and each providing one abutment for the corresponding spring; a pair of spring latches secured within each housing and tending to engage the jaw shanks; a series of notches on the outer edge of each jaw shank for receiving said spring latches thereby to lock the jaws in closed position; the top of each housing being closed except for a slot barely wide enough for the jaws and being pushed against the jaws by the spring, and the jaws being shaped to cover the slot and the housing adjacent the slot so that implements may not be thrust into the housing to release the several latches.

3. In a trap, in combination, a frame; a pair of jaws pivoted upon the frame; trip means on the frame for holding the jaws open; springs on the jaw shanks interposed between the jaws and the frame and tending to close said jaws; housings surrounding the jaw shanks and each providing one abutment for the corresponding spring; a pair of spring latches secured within each housing and tending to engage the jaw shanks; a series of notches on the outer edge of each jaw shank for receiving said spring latches thereby to lock the jaws in closed position; each jaw shank being narrowest adjacent the pivot and widening toward the gripping portion of the jaw, so that the latches catch progressively and travel upwardly responsive to movements by the person or animal caught by the trap; the top of each housing being closed except for a slot barely wide enough for the jaws and being pushed against the jaws by the springs.

4. In a trap, in combination, a frame; a pair of jaws pivoted upon the frame; each jaw having a substantially flat, relatively wide surface for engagement with the limb of the trapped person; the shanks of the two jaws engaging each other when the jaws are closed to hold said surfaces spaced apart a distance less than the least thickness of a human limb; trip means on the frame for holding the jaws open; springs on the jaw shanks interposed between the jaws and the frame and tending to close said jaws; housings surrounding the jaw shanks and each providing one abutment for the corresponding spring; a pair of spring latches secured within each housing and tending to engage the jaw shanks; a series of notches on the outer edge of each jaw shank for receiving said spring latches thereby to lock the jaws in closed position; the top of each housing being closed except for a slot barely wide enough for the jaws and being pushed against the jaws by the spring, and the jaws being shaped to cover the slot and the housing adjacent the slot so that implements may not be thrust into the housing to release the several latches.

5. In a trap, in combination, a frame; a pair of jaws pivoted upon the frame; trip means on the frame for holding the jaws open; springs on the jaw shanks interposed between the jaws and the frame and tending to close said jaws; housings surrounding the jaw shanks and each providing one abutment for the corresponding spring; a pair of spring latches secured within each housing and tending to engage the jaw shanks; a series of notches on the outer edge of each jaw shank for receiving said spring latches thereby to lock the jaws in closed position; the top of each housing being closed except for a slot barely wide enough for the jaws and being pushed against the jaws by the spring; and guards to prevent clogging of the jaw pivots and housing, each guard being mounted on the housing and extending between the jaws.

6. In a trap, in combination, a frame; a pair of jaws pivoted upon the frame; trip means on the frame for holding the jaws open; springs on the jaw shanks interposed between the jaws and the frame and tending to close said jaws; housings surrounding the jaw shanks and each providing one abutment for the corresponding spring; a pair of spring latches secured within each housing and tending to engage the jaw shanks; a series of notches on the outer edge of each jaw shank for receiving said spring latches thereby to lock the jaws in closed position; the top of each housing being closed except for a slot barely wide enough for the jaws and being pushed against the jaws by the spring; and guards to prevent clogging of the jaw pivots and housing, each guard being mounted on the housing and extending between the jaws; each guard consisting of end bars at right angles to each other, each secured at its ends to the housing, one bar being in a plane parallel to the closed jaws and lying between them, and the other bar being just outside the jaws.

7. In a jaw trap, the combination with a frame, a pair of jaws pivoted on the frame at the ends of the shanks of the jaws, and springs normally urging said jaws closed, of jaw-locking means urged upwardly by the spring on each side of the trap, said jaw-locking means engaging with the jaw shanks to prevent opening of the trap when the jaws are partly closed and the springs automatically moving the jaw locking means upwardly on the jaw shanks responsive to struggles of the person captured to hold the jaws closer and closer together.

8. In a trap, in combination, a frame; a pair of pivoted jaws having shanks; a pair of springs urging said jaws toward closed position; members movable over the shanks of the jaws pressed by the respective springs and in contact with said jaws at points spaced from the jaws pivots; and jaw-engaging means on said members spaced at different distances from the medial vertical plane of the trap, and so arranged that the leverage of the two springs is decreased before the jaws close, thereby to diminish the force of the blow struck by the jaws.

9. In a trap, in combination, a pair of pivoted jaws; a spring surrounding each pair of adjacent jaw shanks and urging the jaws to closed position; a housing movable over each pair of said jaw shanks and serving as an abutment for one end of the spring; jaw locking mechanisms within each housing; the top of said housing being slotted for the jaw shanks, but being otherwise closed to prevent tampering with the mechanism inside the housing; each jaw having a pair of laterally projecting wings covering the ends of the slots, said wings being close against the top of the housing when the jaws are closed.

10. In a trap, in combination, a pair of pivoted jaws; a spring surrounding each pair of adjacent jaw shanks and urging the jaws to closed position; a housing movable over each pair of jaw shanks and serving as an abutment for one end of the spring; jaw locking mechanisms within each housing; and lugs fixed to the underside of the top wall of each housing adjacent and on each side of the jaw locking mechanisms to protect the latter against tampering.

In testimony, that I claim the foregoing as my own, I have hereto affixed my signature.

JOHN T. HELBERT.